United States Patent
Gonzales

[11] Patent Number: 5,865,389
[45] Date of Patent: Feb. 2, 1999

[54] ENTRAINMENT AIR DAM

[75] Inventor: Curtis Paul Gonzales, Boise, Id.

[73] Assignee: Hewlett-Packard Company, Palo Alto, Calif.

[21] Appl. No.: 900,210

[22] Filed: Jul. 24, 1997

[51] Int. Cl.[6] .......................... B65H 18/26; G11B 15/60
[52] U.S. Cl. ...................... 242/358; 242/346; 242/548.4; 226/196.4
[58] Field of Search ................... 242/346, 358, 242/548.4, 615.11; 226/196.1

[56] References Cited

U.S. PATENT DOCUMENTS

| | | | |
|---|---|---|---|
| 3,405,855 | 10/1968 | Daly et al. | 226/196.1 |
| 3,405,884 | 10/1968 | Patterson, Jr. | 226/196.1 |
| 3,468,497 | 9/1969 | Kelley | 226/196.1 |
| 3,645,471 | 2/1972 | Kjos | 226/196.1 |
| 3,754,723 | 8/1973 | Meyer | 226/196.1 |
| 3,831,882 | 8/1974 | Fitterer et al. | 226/196.1 |
| 3,843,035 | 10/1974 | Fitterer et al. | 226/196.1 |
| 3,991,956 | 11/1976 | Machida | 226/196.1 |
| 4,361,029 | 11/1982 | Platter | 226/196.1 |
| 4,427,166 | 1/1984 | Oishi et al. | 242/346.2 |
| 4,466,582 | 8/1984 | Shiba | 226/196.1 |
| 4,576,344 | 3/1986 | Sasaki et al. . | |
| 4,582,235 | 4/1986 | Schulz | 226/196.1 |
| 4,789,110 | 12/1988 | Sakaguchi et al. | 242/548.4 |
| 5,284,308 | 2/1994 | Comeaux et al. | 242/358 |
| 5,533,690 | 7/1996 | Kline et al. | 242/547 |

*Primary Examiner*—John P. Darling

[57] ABSTRACT

An air dam (35) is place between free tape (13) extending to a reel (11) and the reel (11). During high speed winding operations, the air dam (35) interrupts air flow toward the convergence (17) of the free tape (13) with the reel (11). This reduces a tendency for air entrainment in tape (15) packed on the reel (11) during the high speed winding operations.

14 Claims, 1 Drawing Sheet

ENTRAINMENT AIR DAM

FIELD OF THE INVENTION

This invention relates to web spooling. In its preferred embodiment, the invention relates to magnetic tape recording and playback systems where a web of magnetic tape is spooled. More particularly, the invention relates to winding the web in a manner which assures alignment of adjacent layers of tape in a tape pack of a reel.

BACKGROUND OF THE INVENTION

In a non-continuous magnetic tape system, magnetic tape is wound around one reel and retrieved from another reel. This arrangement can be present in traditional reel-to-reel systems, two-reel cartridge systems and single reel cartridge systems. In the case of non-continuous single cartridge systems, tape is wound to a take-up reel which is separate from the cartridge, and is usually a part of a tape transport mechanism.

"Tape recorder" is intended to mean magnetic tape transcription equipment. This includes standard tape recorders with fixed heads, as well as helical scan tape transcription equipment used in analog and digital tape recorders. In the preferred embodiment, digital transcription using linear transcription is, although the invention has application in other tape recording environments, such as helical and arcuate scanning. The invention is not intended to be limited to a particular use for the data. "Transcription" is intended to mean read and/or write operations of the tape recorder, and is not intended to be limited to a particular use for the data.

In using the terminology, it must be noted that tape is normally moved in both a forward and reverse direction between the supply and take-up reels. If the respective supply and take-up reels retain their designations, in reverse or rewind operation, tape is being taken up by the supply reel and supplied by the take-up reel. For the purposes of this description, the reel which at a given time is discharging tape will be referred to as the "unwinding reel," and the reel which at any given time is receiving tape will be referred to as the "winding reel. Tape fed to or from a reel normally meets the reel tangentially. Therefore, a location between the tape being fed and the reel can be referred to as, "inside the tape path," with respect to the reel and a location on the far side of the tape being fed would be, "outside the tape path," with respect to the reel. The tape on the reel is referred to as a, "tape pack."

Tape wound around a reel must be properly packed in order to achieve proper performance and to reduce tape damage. It has been found that tape packing, for a given tape configuration is a function of tape winding speed. Tape winding speed, as it affects tape packing is both rotational speed and linear speed. Linear speed, in particular seems to have a significant effect on causing air entrainment. Air entrainment occurs as a result of a tape floating force, which increases with tape travel speed, suggesting a mechanism similar to an active pressure air bearing. Irregular winding results from air entrainment, and is more likely to occur at high winding speeds. High winding speeds refer to a winding speed achieved on a particular tape transport mechanism that is above that needed for transcription, and usually limited by the ability of the tape transport mechanism to reliably transport the tape to a winding reel without damaging the tape. More importantly for this invention, the high speed operation is further limited by a desire not to cause air entrainment in the tape pack. Therefore, what may be a high speed for one tape transport mechanism may be much lower than either the rotational or linear speed of another tape transport mechanism. It is a purpose of the present invention to increase this speed for a given tape transport mechanism.

It is possible to reduce air entrainment by increasing tape tension. The ability to increase tension is dependent on the ability of the tape to receive tensile force without stretching or otherwise distorting. Usually tension is a predetermined factor, depending on an anticipated minimum strength of the tape and other drive performance factors. Thus, the ability to reduce air entrainment by increasing tension is limited. One prior art technique for tape winding included the use of a vacuum pump to reduce air pressure during tape transport operations.

In the case of magnetic tape used to store digital computer data, it is often desired to quickly wind the tape in order to position a desired location of the tape for transcription. This is necessitated by the nature of the media; that is, a web. Data location on the web is dependent on winding and unwinding operations. After the tape is wound to a desired location, the tape is read or written according to the operational protocols of the equipment, until it is necessary to perform read or write operations at a different location. Because of the need to change locations on the tape, the maximum speed that the tape can be wound becomes important to the speed of operation of the tape transcription equipment.

In addition, in some installations, the tape must be rewound as a routine matter, for example when it is necessary to change tape. This is particularly the case of single reel cartridges in non-continuous tape systems. In general, it is common to have operating requirements where it is desired to position tapes at a selected position. During such movement, performance is heavily dependent on tape transport speed.

It is desired to provide quality tape packing in that adjacent layers of tape on a reel are in good alignment. It is therefore desired to provide an ability to reduce air entrainment during winding, and ability to increase tape transport speed without substantially increasing air entrainment. Such an ability implies a requirement to reduce air entrainment for a given tape transport speed and tension. It would further be desired to reduce air entrainment without the use of a vacuum pump or as a supplement to the use of external negative pressure.

SUMMARY OF THE INVENTION

According to the invention, an air dam is used to establish negative pressure at a winding reel. During high speed winding, movement of the tape and of a winding reel causes air pressure to drop across the air dam. This results in a reduction of air pressure between the tape and the winding reel, so that the tape converges toward the winding reel. This convergence has the effect of reducing the angle between the tape being fed to the winding reel and the tape on the winding reel, of allowing air outside the tape path to bias the tape inward toward the winding reel and to some extent reducing the air pressure of air between the tape and the winding reel at the point of convergence of the tape with the tape pack.

In one embodiment, the air dam consists of a stationary member positioned between a supply of tape and a reel, so that movement of air caused by movement of the tape results in a drop in air pressure behind the dam. In further embodiments, an air path outside the tape path is established, so that air is allowed to flow more freely outside of the tape path than inside the tape path.

According to one aspect of the invention, an air dam is used to generate a desired relationship of air pressure to reduce air entrainment in a winding reel.

DESCRIPTION OF THE DRAWING

The drawing FIGURE shows a tape reel and tape in plan view.

DETAILED DESCRIPTION OF THE INVENTION

Figure 1:
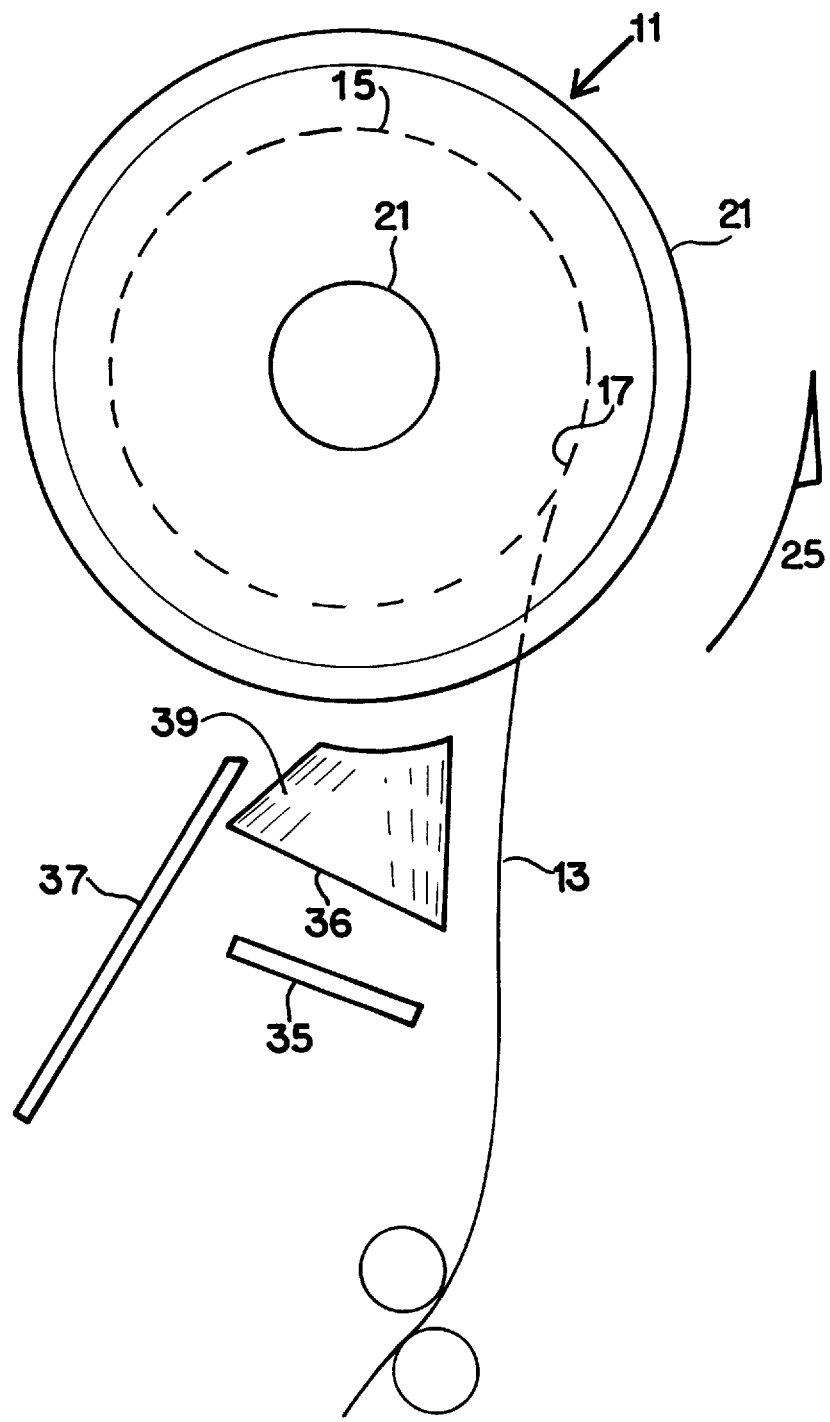

Referring to the drawing Figure, a tape reel 11 has free tape 13 extending from wound tape 15 on the reel 11. A tape path is defined by the position of the free tape 13, and so the free tape 13 extends along the tape path. The wound tape 15 would extend about a hub 21 of the reel 11, except in the case of the reel 11 being completely unwound. The wound tape 15 is also known as packed tape, and a uniform layering of successive wraps of the tape 15 is desired. The free tape 13 joins with the wound tape 15 at a convergence location 17. By way of reference, locations between the free tape 13 and the reel 11 are considered to be inside the tape path, and other locations are considered external to the tape path.

During winding and unwinding operations, the free tape 13 is moving, along with the circumference 21 of the reel 11. The part of the circumference 21 closest to the free tape 13 moves in the same direction as the free tape 13. This invention is concerned with tape take-up operations, so the direction would be as indicated by arrow 25 for the configuration shown. As a result of the movement of the tape, a loosely defined boundary layer air adjacent the tape tends to move along with the tape. The same occurs adjacent the reel 11, where movement of the reel 11 causes adjacent air to move. During winding operations, this results in air currents moving in the direction of convergence of the tape.

A pair of air dams 35, 36 are positioned inside the tape path between the free tape 13 and reel 11. A third air dam 37 is positioned against an anticipated airflow resulting from movement of the reel 11. During winding operations, the air dams 35–37 inhibit air movement toward the convergence 17 of the free tape 13 with the wound tape 15. The air dams 35–37 can be formed in a variety of different shapes. As noted in the drawing, air dams 35 and 37 are flat members, which inhibit air movement. This is believed to reduce air pressure at the convergence location during winding to below that which would occur if the air dams 35, 37 were not provided.

Air dam 36 has a sloped profile which urges air movement above the tape path. A sloped side 39 establishes an air flow which is directed upward. As a result of the upward flow, air downstream of air dam 36 is reduced or flows upward at the convergence 17 of the free tape 13 with the wound tape 15 during winding.

The reduction of air pressure behind the air dams 35–37 has multiple effects. A reduction of air pressure can by itself reduce air available for entrainment. Significantly, air outside of the tape path is not significantly decreased by the air dams 35–37, and therefore tends to bias tape against the packed tape 15 on the reel 11. This results in a favorable relationship between the air pressure outside of the tape path and inside the tape path. The difference in air pressure further tends to deflect the free tape 13 as it approaches the convergence 17 with the packed tape 15. This deflection reduces air volume at the convergence 17 of the free tape 13 with the tape packed on the reel 11.

With less air, there is less air to escape and reduced air pressure encourages air to escape from becoming entrained. Further, by use of the air dams 35–37, air velocity is reduced at the convergence 17, thereby reducing a tendency for air to entrain. The magnitude and the applicability of these effects is not known with specificity, and depend largely on the specific configuration of the tape transport mechanism and air dams.

The drawing Figure shows a physical deflection of the free tape 13 toward the reel 11 on the leeward side of the air dams 35–37. While this is a desired effect, it is entirely possible that the free tape 13 will at times deflect outward, with the air dams 35–37 reducing the outward deflection. Likewise, it is possible that the pressure inside the tape path will be greater than the air pressure outside the tape path. By implementing this invention, it is intended that the pressure inside the tape path be reduced below the pressure which would occur without implementing the invention. While specific configurations of the invention are shown, it is possible to implement the invention in various manners. For example, it is possible to provide the air dam as a part of a cassette, as a part of a tape transport mechanism on which a cassette is inserted or as a part of a permanently mounted take-up reel. It is possible to move one or more of the air dams 35–37 in accordance with the amount of wound tape 15 on the reel 11.

This would permit the air dams 35–37 to be optimally placed, particularly when a minimal amount of wound tape 15 is present. It is also possible to operate the invention where the reel 11 has stationary parts such as flanges, or where air flow about the free tape 13 is inhibited or blocked. While the invention was described in terms of the preferred embodiment of tape transcription equipment, it is possible to use it in association with other types of webs. Accordingly, the invention should be read as limited only by the appended claims.

What is claimed is:

1. Apparatus for winding a flexible web, comprising:
   a. a reel rotatable a center axis for receiving the flexible web in a winding operation;
   b. a guide arrangement for guiding free web to the reel during the winding operation, wherein the free web converges with the reel;
   c. an air dam positioned on the same side of the web as the center axis, thereby reducing air entrainment during web winding operations;
   d. said free web converging with the reel at a convergence location; and
   e. the air dam including a member having a surface contour for diverting air flow away from the convergence location.

2. Apparatus as described in claim 1, further comprising: said air dam effecting a deflection of the web without physically contacting the web.

3. Apparatus for winding a flexible web, comprising:
   a. a reel rotatable a center axis for receiving the flexible web in a winding operation;
   b. a guide arrangement for guiding free web to the reel during the winding operation, wherein the free web converges with the reel;
   c. an air dam positioned on the same side of the web as the center axis, thereby reducing air entrainment during web winding operations, the air dam positionable, at least during a high speed winding operation for said reel, to a location suitable for controlling air flow without engaging the web on the reel.

4. Apparatus as described in claim 3, further comprising:

a. said free web converging with the reel at a convergence location; and b. the air dam including a member for at least partially blocking air flow toward the convergence location.

5. Apparatus as described in claim 3, further comprising:

the air dam including a surface substantially normal to an anticipated flow of air toward a convergence location.

6. Apparatus for winding a flexible web, comprising:

a. a reel rotatable a center axis for receiving the flexible web in a winding operation;

b. a guide arrangement for guiding free web to the reel during the winding operation, wherein the free web converges with the reel;

c. an air dam positioned on the same side of the web as the center axis, thereby reducing air entrainment during web winding operations, the air dam including a surface canted from normal to an anticipated flow of air toward a convergence location, thereby directing air away from said convergence location.

7. Tape transport mechanism, having a normal speed for performing transcription operations and a high speed for making gross changes in a position of the tape, comprising:

a. a reel having a center axis for receiving the tape during said high speed operation;

b. the tape transport mechanism including a guide arrangement for guiding free tape to the reel during the winding operation, wherein the free tape converges with the reel; and c. an air dam positioned at the tape transport mechanism on the same side of the tape as the center axis, thereby reducing air entrainment during said high speed;

d. said free tape converging with the reel at a convergence location; and e. the air dam including a member having a surface contour for diverting air flow away from the convergence location.

8. Tape transport mechanism as described in claim 7, further comprising:

said air dam effecting a deflection of the tape without physically contacting the tape.

9. Tape transport mechanism, having a normal speed for performing transcription operations and a high speed for making gross changes in a position of the tape, comprising:

a. a reel having a center axis for receiving the tape during said high speed operation;

b. the tape transport mechanism including a guide arrangement for guiding free tape to the reel during the winding operation, wherein the free tape converges with the reel; and c. an air dam positioned at the tape transport mechanism on the same side of the tape as the center axis, thereby reducing air entrainment during said high speed, the air dam positionable, at least during a high speed winding operation for said reel, to a location suitable for controlling air flow without engaging the tape on the reel.

10. Tape transport mechanism as described in claim 9, further comprising:

a. said free tape converging with the reel at a convergence location; and b. the air dam including a member for at least partially blocking air flow toward the convergence location.

11. Tape transport mechanism as described in claim 9, further comprising:

the air dam including a surface substantially normal to an anticipated flow of air toward a convergence location.

12. Tape transport mechanism, having a normal speed for performing transcription operations and a high speed for making gross changes in a position of the tape, comprising:

a. a reel having a center axis for receiving the tape during said high speed operation;

b. the tape transport mechanism including a guide arrangement for guiding free tape to the reel during the winding operation, wherein the free tape converges with the reel; and c. an air dam positioned at the tape transport mechanism on the same side of the tape as the center axis, thereby reducing air entrainment during said high speed, the air dam including a surface canted from normal to an anticipated flow of air toward a convergence location, thereby directing air away from said convergence location.

13. Tape transport mechanism as described in claim 12, further comprising:

said air dam effecting a deflection of the tape without physically contacting the tape.

14. Tape transport mechanism as described in claim 12, further comprising:

a. said free tape converging with the reel at a convergence location; and b. the air dam including a member for at least partially blocking air flow toward the convergence location.

* * * * *